Nov. 30, 1943. H. NERWIN ET AL 2,335,439
ROLLFILM CAMERA
Filed June 18, 1940 3 Sheets-Sheet 1

Inventors.
Hubert Nerwin
Karl Wunderlich
By
Singer, Stern & Carlberg
Attys.

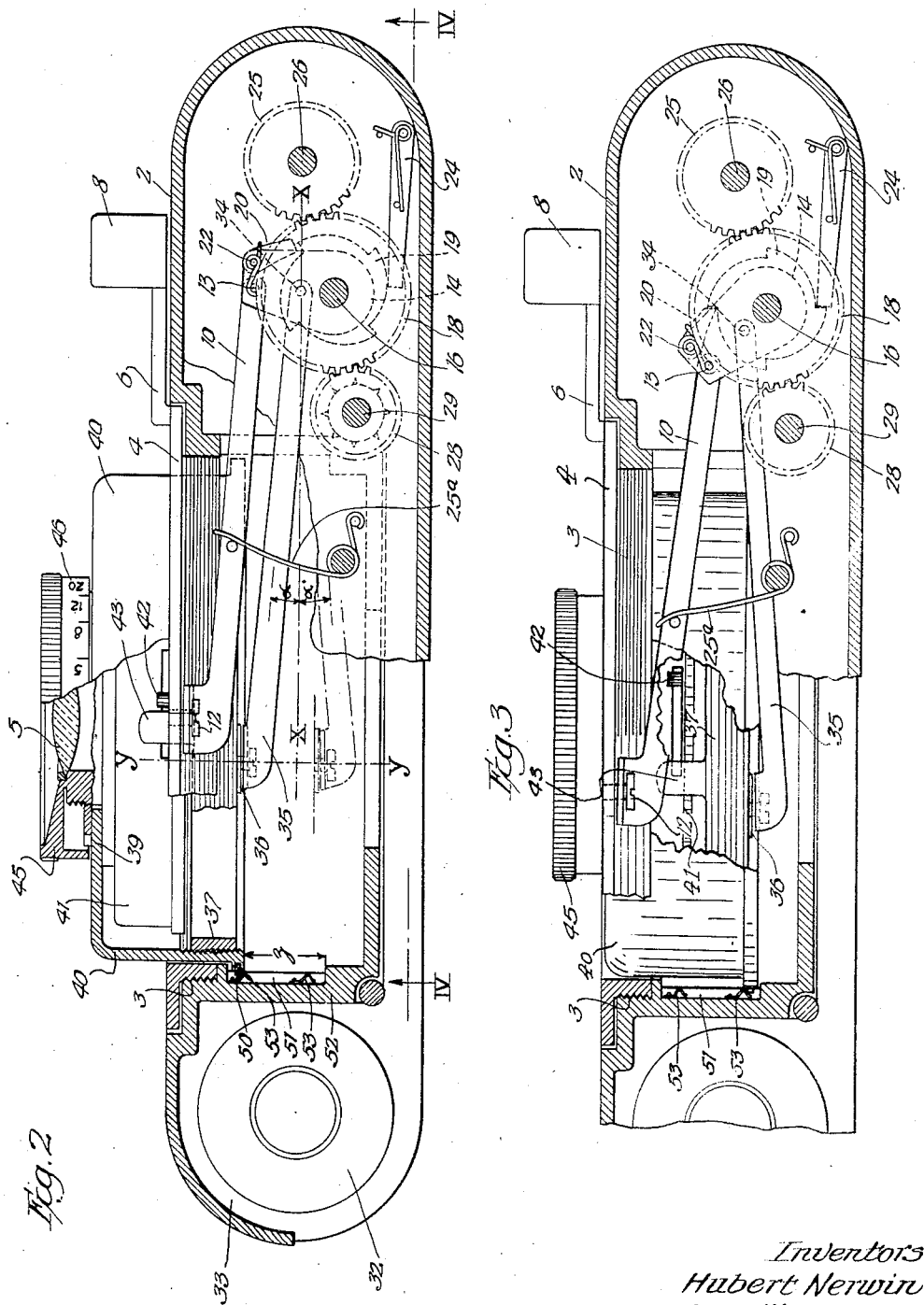

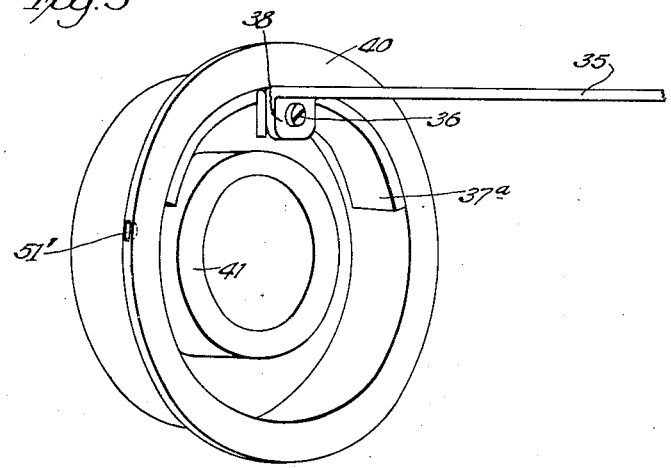
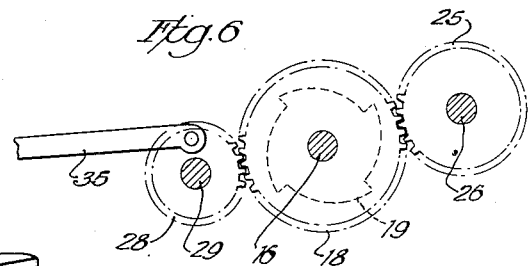
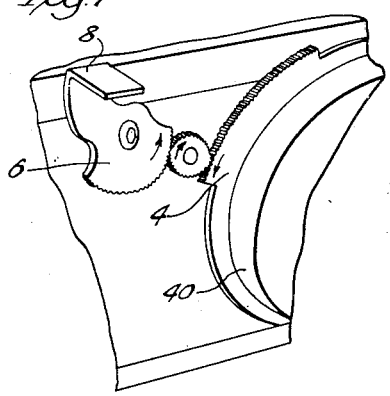
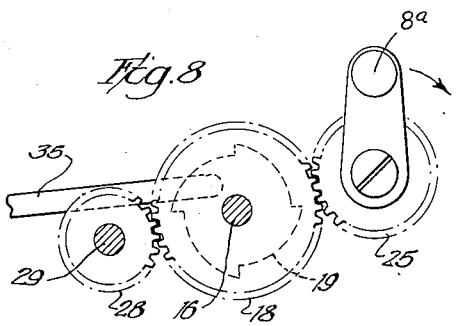

Patented Nov. 30, 1943

2,335,439

UNITED STATES PATENT OFFICE 2,335,439

ROLL-FILM CAMERA

Hubert Nerwin and Karl Wunderlich, Dresden, Germany; vested in the Alien Property Custodian Application June 18, 1940, Serial No. 341,164
In Germany June 19, 1939

5 Claims. (Cl. 95—31)

The invention relates to improvements in rollfilm cameras, and particularly is directed to miniature cameras equipped with a central shutter. In cameras of this type the central shutter is combined with the photographic objective and is mounted with the latter on a support adapted to be moved in axial direction toward and away from the film in the focal plane.

It is an object of the invention to provide the rollfilm camera with a manually operable member on the front wall of the camera casing for simultaneously tensioning the central shutter and advancing the film for bringing the next unexposed film section in a position behind the photographic objective.

Another object of the invention is to rotatably mount the manually operable member on the front wall of the camera casing concentrically about an axially shiftable carrier which supports the camera objective and the central shutter.

It is also an object of the invention to mount the central shutter within an axially shiftable cup-shaped carrier which is provided with a tubular wall slidably passing through the annular manually operable member on the front wall of the camera casing.

Another object of the invention is to use said cup-shaped carrier as a support for a member which is operatively connected with the film advancing mechanism and actuates the customary shutter tensioning lever whenever the film is advanced.

Other objects of the invention will be apparent or will be specifically pointed out in the description forming a part of this specification, but the invention is not limited to the embodiment of the invention herein described, as various forms may be adopted within the scope of the claims.

In the drawings:

Fig. 2 is a top plan view of the rollfilm camera in extended operative position, with parts in section.

Fig. 3 is a similar view as Fig. 2, except that the extensible part of the camera has been moved into the camera casing to its inoperative position.

Fig. 5 is a perspective view of an objective and shutter carrier employing a ring-sector member for actuating the shutter tensioning mechanism and showing the operating bar for the ring-sector member connected thereto.

Fig. 6 is a detailed elevation with parts in section of the gear train employed in advancing the film and shows the drive bar used to actuate the shutter tensioning mechanism connected directly to one of the gears in the gear train.

Fig. 7 is a perspective view, with parts broken away, of the front wall of the camera casing and shows a drive ring rotatably mounted thereon and adapted to be connected to the film advancing mechanism of the camera together with modified means, which employs gearing, for rotating the drive ring.

Fig. 8 is a view similar to Figure 6 showing a modification of the actuating means for driving the film advancing mechanism.

Figure 1:
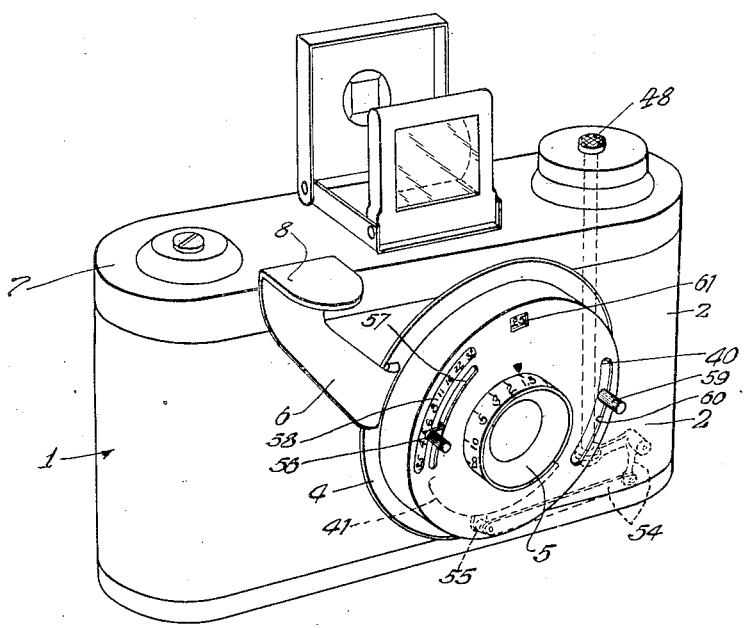
Fig. 1 is a perspective view of a rollfilm camera of the present invention.

Referring to the drawings, the front wall 2 of the camera casing 1 has rotatably attached thereto, for instance by means of a fine thread 3, an annular member 4 concentrically with respect to the axis of the photographic objective 5. An arm 6 extending outwardly from said annular member 4 terminates at a point just above the top wall 7 of the camera casing 1 in a finger piece 8 which is engaged by the user of the camera to be depressed when the film is to be advanced and the shutter is to be tensioned.

Figure 4:
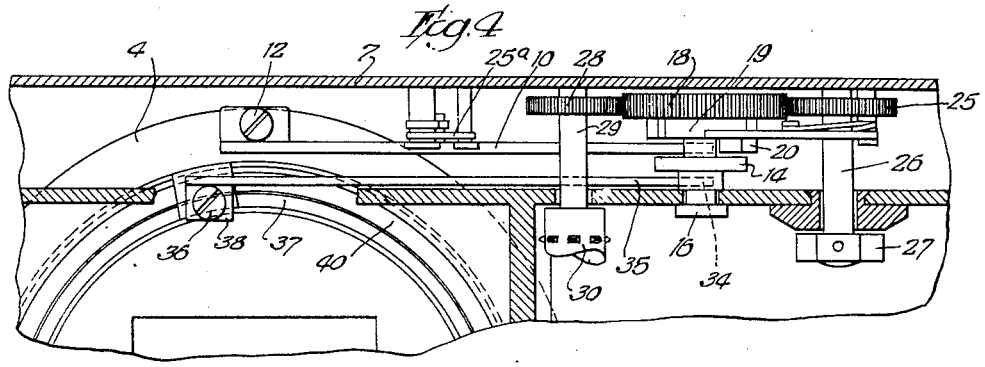
Fig. 4 is a vertical sectional view of a portion of the camera, substantially along the line IV—IV of Fig. 2 and looking in the direction of the arrows.

A bar 10, which according to Fig. 4 is positioned in the camera casing 1 spaced from and substantially parallel to the top wall 7 thereof, is pivotally connected at one end by a pin 12 to the upper portion of the annular member 4 and with its other end at 13 (Figs. 2 and 3) to an oscillatable member 14 which forms one element of the film advancing mechanism. The member 14 is rotatable on a shaft 16 which also supports a gear 18 fixedly attached to a ratchet wheel 19; the latter is adapted to be rotated step by step in clockwise direction by a spring influenced pawl 20 pivotally attached at 22 to the member 14. A holding pawl 24 prevents a return movement of the ratchet wheel 19 and gear 18, while a spring 25ª acting on the bar 10 returns the latter and therewith the annular member 4 and the oscillatable member 14 to their initial position after each manual depression of the finger piece 8.

The gear 18 meshes with a gear 25 on the shaft 26 carrying the film take-up spool engaging clutch member 27 and also meshes with a gear 28 on the shaft 29 carrying the customary film advancing sprocket 30. The film supply spool 32 or cartridge is mounted in a chamber 33 at the other end of the camera casing 1, as shown in Figs. 2 and 3.

The oscillatable member 14 is also connected at 34 with one end of a second bar 35, whose other end is pivotally attached at 36 to an inwardly bent lug 38 of a ring 37, which ring 37 is rotatably mounted by means of a thread of low pitch within the cup-shaped carrier 40 for the photographic objective 5 and the central shutter 41. The central shutter 41, which is fixedly attached to the inner face of the bottom wall 39 of the carrier 40, coaxially with the objective, is provided with an outwardly projecting tensioning lever 42 extending into the path of movement of an axially extending lug 43 of the ring 37 to be actuated by the latter each time the bar 35 rotates the ring in clockwise direction when the finger piece 8 is manually depressed.

It thus is apparent, that upon a depression of the finger piece 8 the annular member 4 is rotated clockwise, against the action of the spring 25$^a$, and thereby simultaneously advances the film one step—which step is equal the length of one picture—and tensions the shutter 41.

The photographic objective 5 is provided for focusing purposes with a rotatably adjustable front lens in a mount 45 extending outwardly from the wall 39 of the cup-shaped carrier 40. The outer circumference of the mount 45 is provided with a focusing scale 46. A depressible shutter release member 48 is preferably arranged on the top wall 7 of the camera casing 1.

The depression of the release member 48 during an exposure is transferred to the release lever 55 of the shutter 41 by a linkage 54. A lever 56 projecting over the front side of the carrier 40 through a slot 57 serves to set the diaphragm of the objective 5 by means of a scale 58. For the purpose of setting the exposure time of the shutter 41 there is provided a further lever 59 projecting through a slot 60 in front of the carrier 40. The correct setting of the exposure time is readable through a window 61 in the front side of the carrier 40.

The cup-shaped carrier 40, with the photographic objective 5 and central shutter 41 thereon, is mounted for axially slidable movement in the camera casing. The carrier 40 is guided in its mounting 52 in the camera housing 1 by means of a wedge 50 and a groove 51; it is held in the extended or unextended position by elastic stops 53. In Fig. 2 the carrier 40 is shown axially extended, in which position the camera is in operative condition. The film advancing mechanism is shown in a position in which the film is being advanced and the shutter being tensioned. Fig. 3 shows the inoperative position of the camera, in which the carrier 40 and the parts connected therewith have been retracted or pushed into the camera casing, thus reducing the space required for storing or carrying the camera in a pocket or the like to a minimum. The shutter is shown in tensioned position, ready to be released, while all other parts, as 4, 6, 10 are shown in their initial position.

In order to insure a faultless operation of the shutter tensioning mechanism 35, 37, 43, 42, even in the retracted inoperative position of the carrier 40, it is advisable and forms an object of the invention to make the angles $\alpha$ and $\alpha'$ (Fig. 2) approximately equal. These angles $\alpha$ and $\alpha'$ are formed between the line X—X, which passes through the pivot point 34 and which is perpendicular to the line Y—Y (Fig. 2), and the longitudinal axis of the bar 35 in the operative and inoperative position respectively of the camera. Or in other words, the line X—X bisects the angle $\alpha + \alpha'$ formed between the two end positions of the bar 35 in the extended and retracted position respectively of the cup-shaped carrier. It will also be noted that the line X—X is substantially parallel to the front wall 2 of the camera casing 1 and lies in a plane which intersects the optical axis of the objective 5 at a right angle. The distance which the cup-shaped carrier 40 may be axially moved into the camera casing is indicated with $z$ in Fig. 2.

The ring 37 with its two lugs 38 and 43 may be substituted by an oscillating device having the form of a ring sector-shaped member 37$a$ (see Fig. 5). The pivotal connection of the bar 35 with the film advancing mechanism does not have to be located directly on the oscillatable member 14, but may be located on an intermediate member, as for instance on a gear of a train of gears, which in turn is connected with the film advancing mechanism (see Fig. 6). It is also possible to provide a manually operable finger piece 8 which by means of a gear or a gearing actuates the annular member 4 (see Fig. 7). Furthermore, the rapid acting wind-up device consisting of the parts 4, 8, 12 and 25 may be substituted by a rotatable button or a lever 8$^a$ which acts directly on the film advancing mechanism 18, 19, 25 and which at the same time operates the bar 35 of the shutter tensioning device (see Fig. 8).

What we claim is:

1. In a rollfilm camera, a camera casing having a front wall, a photographic objective, a central shutter provided with a shutter tensioning lever, a cup-shaped carrier within which said shutter and objective are mounted in coaxial relation with said carrier, said objective including an adjustable front lens projecting outwardly through the bottom wall of said cup-shaped carrier, said camera casing being provided with a recess extending inwardly from said front wall for axially slidably supporting said carrier for moving said objective and shutter from a retracted inoperative position within said camera casing to an extended operative position and vice versa, means for preventing a rotative movement of said carrier within said recess, a film advancing mechanism within said camera casing, a ring for actuating said shutter tensioning lever mounted rotatably within said cup-shaped carrier, a bar operatively connecting said film advancing mechanism with said ring, a manually rotatable member mounted on the outer face of the front wall of said camera casing so as to be rotatable about the common axis of said carrier, objective and shutter, and a connecting rod within said camera casing for operatively connecting said manually rotatable member with said film advancing mechanism, whereby upon a manual rotation of said rotatable member in one direction said film advancing mechanism and said ring are operated simultaneously to advance the film and tension the shutter respectively.

2. In a rollfilm camera, a camera casing having a front wall, a photographic objective, a central shutter provided with a shutter tensioning lever, a cup-shaped carrier within which said shutter and objective are mounted in axial alinement with each other, said objective including an adjustable front lens projecting outwardly through the bottom wall of said cup-shaped carrier, said camera casing being provided with a recess extending inwardly from said front wall for axially slidably supporting said carrier for moving said objective and shutter from a retracted inoperative position within said camera casing to an extended operative position and vice versa, means for preventing a rotative movement of said carrier within said recess, a film advancing mechanism within said camera casing, a ring for actuating said shutter tensioning lever rotatably supported by said cup-shaped carrier so as to be oscillatable about the optical axis of said objective and movable with said carrier in axial direction, a bar operatively connecting said film advancing mechanism with said ring, the line bisecting the angle formed between the two end positions of said bar in the retracted and extended position respectively of said cup-shaped carrier being positioned substantially in a plane intersecting the optical axis of the photographic objective at a right angle, a manually rotatable member on the outside of said camera casing and means including a connecting rod, operatively connecting said member with said film advancing mechanism, whereby upon a manual rotation of said rotatable member in one direction said film advancing mechanism and said ring are operated simultaneously to advance the film and tension the shutter respectively.

3. In a rollfilm camera, a camera casing having a front wall, a photographic objective, a central shutter with a shutter tensioning lever, a cup-shaped carrier within which said shutter and objective are mounted in coaxial relation with said carrier, the front end of said objective projecting outwardly through the bottom wall of said carrier, said camera casing being provided with a recess extending inwardly from said front wall for axially slidably supporting said carrier for moving said objective and shutter from a retracted inoperative position within said camera casing to an extended operative position and vice versa, means for preventing a rotative movement of said carrier within said recess, a film advancing mechanism within said camera casing, a ring for actuating said shutter tensioning lever rotatably supported by the circumferential wall of said cup-shaped carrier so as to be oscillatable about the optical axis of said objective and movable with said carrier in axial direction, a bar operatively connecting said film advancing mechanism with said ring, the line bisecting the angle formed between the two end positions of said bar in the retracted and extended position respectively of said cup-shaped carrier extending substantially parallel to the front wall of said camera casing, a manually rotatable member mounted on the front wall of said camera casing so as to be rotatable about the common axis of said carrier, objective and shutter, and means including a connecting rod within said camera casing for operatively connecting said manually rotatable member with said film advancing mechanism, whereby upon a manual rotation of said rotatable member in one direction said film advancing mechanism and said shutter tensioning lever are operated simultaneously to advance the film and tension the shutter respectively.

4. A rollfilm camera as claimed in claim 1, in which said cup-shaped carrier is slidably supported by said manually rotatable member which is mounted rotatably on the front wall of the camera casing and forms a portion of the supporting wall of said recess.

5. A rollfilm camera as claimed in claim 1, in which said shutter tensioning lever is actuated by an axially extending lug on the ring which is rotatably supported at the inner open end of said cup-shaped carrier, said ring having a second lug which by means of said bar is operatively connected with said film advancing mechanism.

HUBERT NERWIN.
KARL WUNDERLICH.